(12) United States Patent
Ashmawi et al.

(10) Patent No.: US 11,407,486 B2
(45) Date of Patent: Aug. 9, 2022

(54) WINDOW CLAMP SYSTEM FOR A VEHICLE

(71) Applicant: THE BOEING COMPANY, Chicago, IL (US)

(72) Inventors: Waeil M. Ashmawi, Bellevue, WA (US); Sahrudine Apdalhaliem, Seattle, WA (US); Jaime C. Garcia, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 266 days.

(21) Appl. No.: 16/683,848

(22) Filed: Nov. 14, 2019

(65) Prior Publication Data

US 2021/0147058 A1 May 20, 2021

(51) Int. Cl.
*B64C 1/14* (2006.01)
*F16B 2/18* (2006.01)
*F16B 2/24* (2006.01)

(52) U.S. Cl.
CPC .............. *B64C 1/1492* (2013.01); *F16B 2/18* (2013.01); *F16B 2/241* (2013.01)

(58) Field of Classification Search
CPC ....... B64C 1/1492; B64C 1/14; B64C 1/1476; F16B 2/18; F16B 2/241
USPC .... 248/544, 689, 549, 466, 468, 475.1, 476, 248/477, 478, 488, 316.5, 229.23, 229.25, 248/231.51, 231.71; 244/129.3
See application file for complete search history.

(56) References Cited

U.S. PATENT DOCUMENTS

| | | | | | |
|---|---|---|---|---|---|
| 2,184,893 | A | * | 12/1939 | Lumley | A47G 1/215 52/785.1 |
| 2,306,023 | A | * | 12/1942 | Lumley | A47G 1/215 52/714 |
| 5,271,581 | A | * | 12/1993 | Irish | B64C 1/1492 244/129.3 |
| 5,826,824 | A | * | 10/1998 | Martin | B64C 1/32 244/129.3 |
| 6,786,453 | B2 | * | 9/2004 | Jones | B64C 1/1492 244/129.3 |
| 6,814,385 | B2 | * | 11/2004 | Fujiwara | B60J 10/70 296/146.15 |
| 6,938,858 | B1 | * | 9/2005 | Schneider | B64G 1/12 244/129.3 |
| 7,202,903 | B2 | * | 4/2007 | Lin | G06F 1/1601 248/177.1 |
| 7,784,762 | B2 | * | 8/2010 | Klein | F16M 11/10 248/544 |
| 7,823,833 | B2 | * | 11/2010 | Wood | B60J 1/006 244/129.3 |
| 8,015,762 | B2 | * | 9/2011 | Krahn | B64C 1/1492 52/204.597 |

(Continued)

*Primary Examiner* — Eret C McNichols
*Assistant Examiner* — Michael McDuffie
(74) *Attorney, Agent, or Firm* — The Small Patent Law Group LLC; Joseph M. Butscher (57) ABSTRACT

A window clamp system and method are to secure a window pane to a window frame of a vehicle. The window clamp system includes a mounting bracket configured to be secured to the window frame, one or more ratchets coupled to the mounting bracket, and a spring clip configured to move in relation to the mounting bracket and the one or more ratchets. The spring clip is configured to engage a seal positioned around the window pane.

21 Claims, 9 Drawing Sheets

(56) References Cited

U.S. PATENT DOCUMENTS

| | | | | |
|---|---|---|---|---|
| 8,726,968 | B2* | 5/2014 | Sievers | B60J 1/2011 |
| | | | | 160/90 |
| 8,944,381 | B2* | 2/2015 | Ebner | B64C 1/1492 |
| | | | | 244/129.3 |
| 2007/0075187 | A1* | 4/2007 | Bold | B64C 1/1492 |
| | | | | 244/129.3 |
| 2012/0001025 | A1* | 1/2012 | Sabadie | B64C 1/1484 |
| | | | | 244/129.3 |
| 2012/0193474 | A1* | 8/2012 | Lafon | B64D 25/16 |
| | | | | 244/129.3 |
| 2012/0217346 | A1* | 8/2012 | Eberle | B05B 12/26 |
| | | | | 244/129.3 |
| 2014/0284425 | A1* | 9/2014 | Kirchoff | B64C 1/1484 |
| | | | | 244/129.3 |
| 2014/0314973 | A1* | 10/2014 | Desroches | B60J 1/007 |
| | | | | 428/34 |
| 2014/0319277 | A1* | 10/2014 | Yokoi | H05K 9/0005 |
| | | | | 244/129.3 |
| 2015/0060603 | A1* | 3/2015 | Yokoi | E06B 5/18 |
| | | | | 244/129.3 |
| 2015/0239548 | A1* | 8/2015 | Lyon | B64C 1/1492 |
| | | | | 49/506 |
| 2016/0031544 | A1* | 2/2016 | Coraboeuf | B64D 15/00 |
| | | | | 244/129.3 |
| 2020/0244008 | A1* | 7/2020 | Wu | H05K 7/142 |
| 2020/0290720 | A1* | 9/2020 | Dibowski | F16B 2/10 |

* cited by examiner

WINDOW CLAMP SYSTEM FOR A VEHICLE

FIELD OF EMBODIMENTS OF THE DISCLOSURE

Embodiments of the present disclosure generally relate to a window clamp system for a vehicle, such as a commercial aircraft.

BACKGROUND OF THE DISCLOSURE

Window assemblies are secured to a fuselage of a commercial aircraft. Each window assembly includes a window pane, such as an acrylic window pane, secured to a window frame, which is secured to the fuselage.

Typically, twelve support brackets are bolted around a periphery of the window frame. A nut plate is coupled to each support bracket. A spring clip is mounted to the nut plate through a fastener, such as a bolt. An opposite end of the spring clip is coupled to a perimeter seal around the window pane. The coupling of the spring clip to the nut plate via the fastener deforms the spring clip, biasing the spring clip into the perimeter seal, and thereby securing the window pane to the bracket.

Commercial aircraft may include different sized window assemblies. As such, different sized spring clips are typically used with respect to the different sized window assemblies. That is, each different window assembly may be secured to the window frame through different types of spring clips.

Moreover, an individual typically uses a tool to separately engage each fastener of the support brackets. For example, an individual typically engages the fastener coupled to the nut plate to ensure that the spring clip securely engages the perimeter seal around the window pane.

As can be appreciated, a commercial aircraft includes numerous window assemblies. As such, the process of installing the window assemblies is time and labor intensive, as the individuals installing the window assemblies need to ensure that the proper spring clips are being used with respect to a particular type of window assembly, as well as individually engaging the fasteners with tools.

In general, the process of installing window assemblies on a commercial aircraft is labor intensive and costly, and typically requires different parts for different sized window assemblies.

SUMMARY OF THE DISCLOSURE

A need exists for a system and method for efficiently and easily installing window assemblies on a vehicle, such as a commercial aircraft. Further, a need exists for a system and method for quickly and easily verifying that the window assemblies are properly installed.

With those needs in mind, certain embodiments of the present disclosure provide a window clamp system configured to secure a window pane to a window frame of a vehicle. The window clamp system includes a mounting bracket configured to be secured to the window frame, one or more ratchets coupled to the mounting bracket, and a spring clip configured to move in relation to the mounting bracket and the one or more ratchets. The spring clip is configured to engage a seal positioned around the window pane.

In at least one embodiment, the mounting bracket includes a base configured to seat on the window frame, an upstanding wall connected to the base, and a clip support wall connected to the upstanding wall. The spring clip is slidably coupled to the clip support wall.

In at least one embodiment, the spring clip includes a main beam slidably supported on the mounting bracket, and a biasing spring segment extending from the main beam. The biasing spring segment is configured to directly engage the seal.

As an example, the ratchets include a first ratchet proximate a first side of the spring clip, and a second ratchet proximate a second side of the spring clip. In at least one embodiment, the ratchets include a clip engager pivotally coupled to the mounting bracket through a pin, and a lever extending from the clip engager.

In at least one embodiment, the window clamp system also includes a cover secured to the mounting bracket over at least a portion the spring clip and a portion of the one or more ratchets.

In at least one embodiment, the spring clip includes a pressure adjustment segment including a plurality of teeth. The one or more ratchets are configured to engage the plurality of teeth to secure the spring clip in a plurality of positions relative to the mounting bracket. In at least one embodiment, the pressure adjustment segment includes a plurality of pressure indicators indicating a plurality of defined pressures that the spring clip is configured to exert into the seal.

In at least one embodiment, the window clamp system also includes one or more biasing members that bias the one or more ratchets towards the spring clip.

In at least one embodiment, the window clamp system also includes one or more locking pins moveably coupled to the one or more ratchets. The one or more locking pins extend into one or more through-holes of the mounting bracket to lock the one or more ratchets in a locked position in which the spring clip is locked in position in relation to the mounting bracket and the one or more ratchets. The one or more locking pins are removed from the one or more through-holes so that the one or more ratchets are in a release position in which the spring clip is moveable relative to the mounting bracket and the one or more ratchets.

Certain embodiments of the present disclosure provide a window clamp method configured to secure a window pane to a window frame of a vehicle. The window clamp method includes securing a mounting bracket to the window frame positioned within a fuselage of the vehicle, moving a spring clip in relation to the mounting bracket and one or more ratchets coupled to the mounting bracket, and engaging a seal positioned around the window pane with the spring clip through said moving.

Certain embodiments of the present disclosure provide an aircraft including a fuselage, and a window assembly secured to the fuselage. The the window assembly comprises a window frame, a window pane, a seal positioned around the window pane, and a plurality of window clamp systems that secure the window pane to the window frame

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a window clamp system and method that provides easy, accurate, and quick installation of window assemblies on a vehicle, such as a commercial aircraft. The window clamp system is adaptable and configured for use with window assemblies of different shapes and sizes.

Certain embodiments of the present disclosure provide a window clamp system that is configured to secure a window pane to a window frame of a window assembly. The window clamp system includes a mounting bracket configured to attach to the window frame, one or more ratchets coupled to the mounting bracket, and a spring clip including a plurality of ratchet teeth. The spring clip is configured to slide relative to the mounting bracket and the ratchet. A locking mechanism is configured to lock the ratchet in place relative the mounting bracket and the spring clip so that the spring clip exerts a force onto the window pane, such as through a perimeter seal. In at least one embodiment, the locking mechanism includes a locking pin that is configured to lock the ratchet relative to the mounting bracket. The locking mechanism may include a biasing element to bias the ratchet against the clip and lock the clip in place. The ratchet teeth may be associated with pressure indicators that clearly show various calibrated pressure levels that are used to maintain the window pane secured to the window frame. A cover may be secured to the mounting bracket. At least a portion of the spring clip may be positioned between the mounting bracket and the cover.

Figure 1:
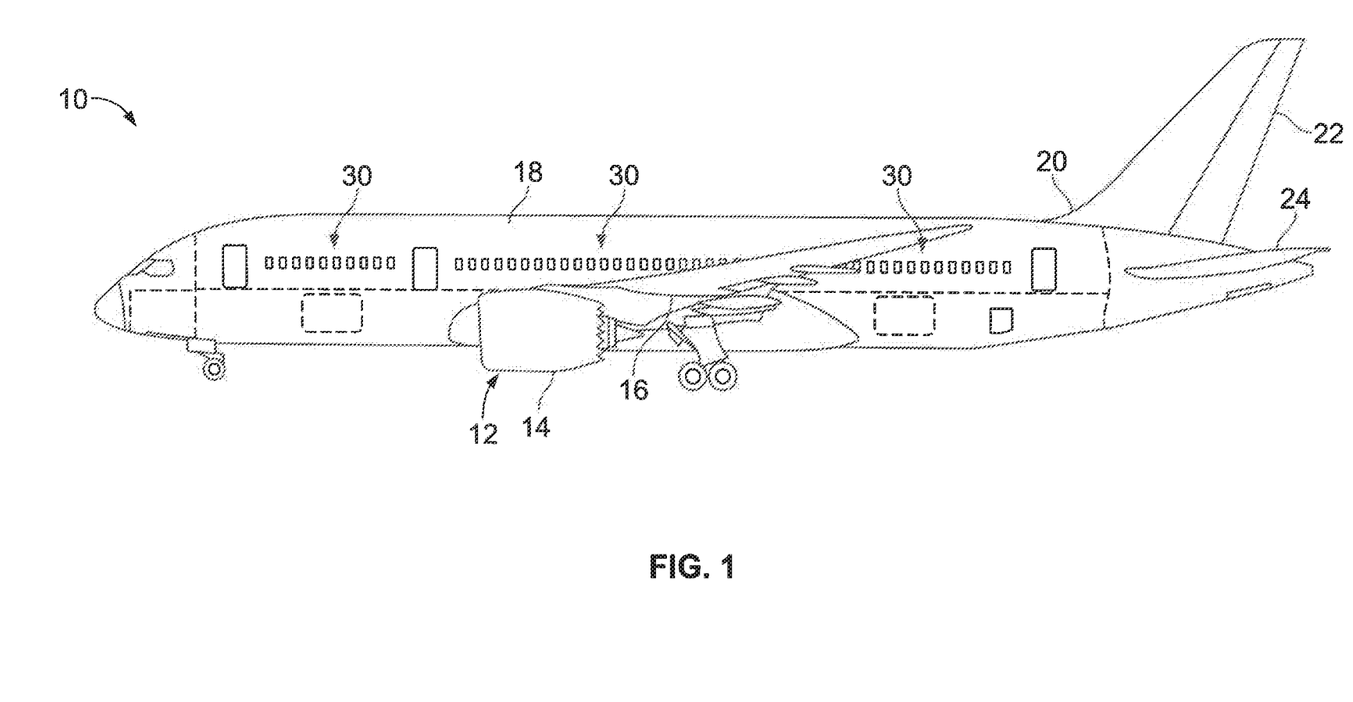
FIG. 1 illustrates a lateral view of an aircraft, according to an embodiment of the present disclosure.

FIG. 1 illustrates a lateral view of an aircraft 10, according to an embodiment of the present disclosure. The aircraft 10 includes a propulsion system 12 that may include two engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The aircraft 10 also includes a plurality of window assemblies 30. The window assemblies 30 are secured to the fuselage 18. As described herein, window clamp systems are used to securely couple window panes of the window assemblies 30 to window frames, which are, in turn, secured to the fuselage 18.

Alternatively, instead of an aircraft, embodiments of the present disclosure may be used with various other vehicles, such as automobiles, buses, locomotives and train cars, seacraft, spacecraft, and the like.

Figure 2:
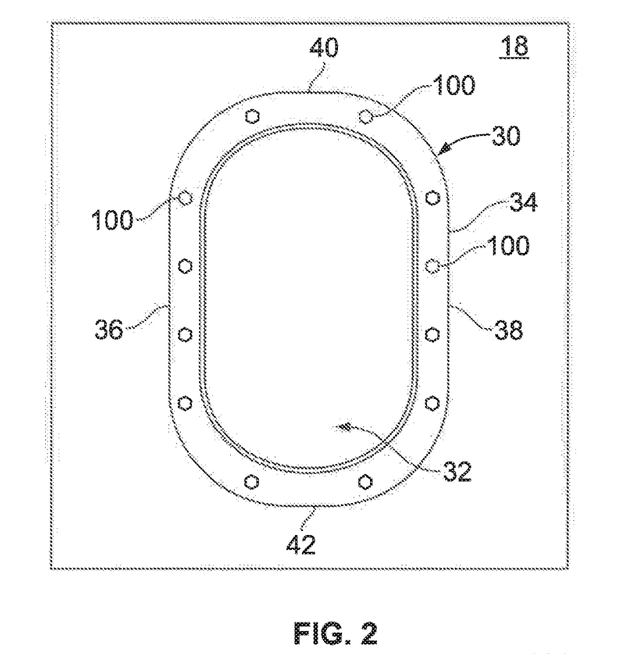
FIG. 2 illustrates an interior lateral view of a window assembly secured to a fuselage, according to an embodiment of the present disclosure.

FIG. 2 illustrates an interior lateral view of a window assembly 30 secured to the fuselage 18, according to an embodiment of the present disclosure. FIG. 2 shows an interior view of the window assembly 30. That is, the window assembly 30 is shown from inside the fuselage 18. The window assembly 30 includes a window pane 32 coupled to a window frame 34. A plurality of window clamp systems 100 securely couple the window pane 32 to the window frame 34. As shown, a total of twelve window clamps systems 100 may be used to secure the window pane 32 to the window frame 34. Four window clamps systems 100 may be on a first side 36 of the window assembly 30, four window clamp systems 100 may be on a second side 38 of the window assembly 30, two window clamp systems 100 may be on a top 40 of the window assembly 30, and two window clamp systems 100 may be on a bottom 42 of the window assembly 30. The window clamp systems 100 are disposed around a periphery of the window assembly 30. Optionally, more or less window clamp systems 100 than shown may be used to secure the window pane 32 to the window frame 34.

Figure 3:
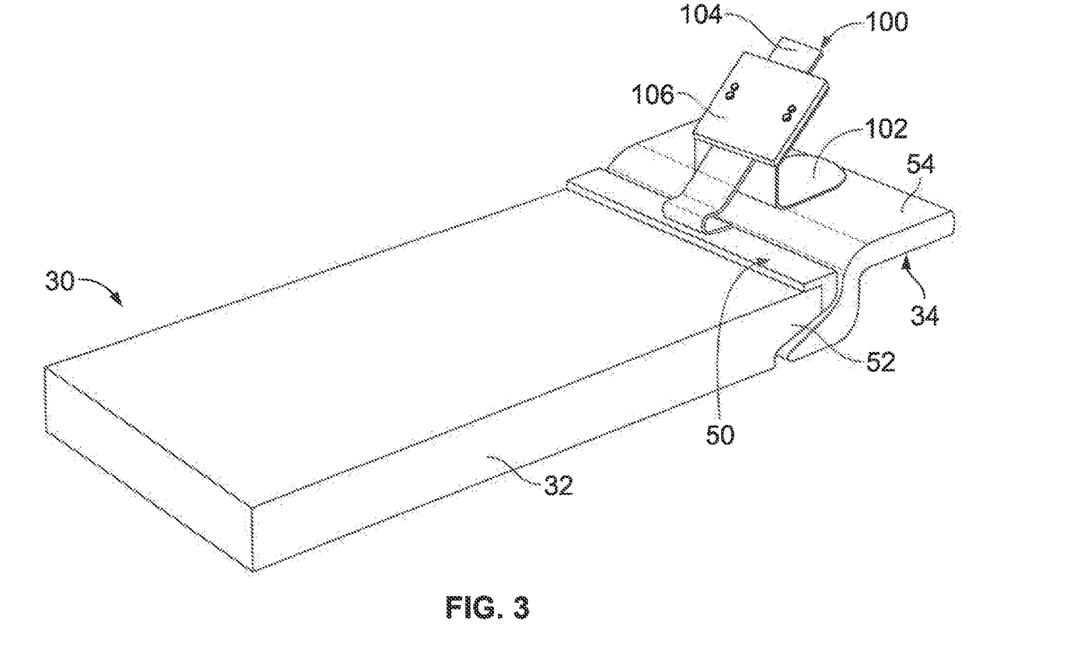
FIG. 3 illustrates a perspective interior view of a window clamp system coupled to a window assembly, according to an embodiment of the present disclosure.

FIG. 3 illustrates a perspective interior view of a window clamp system 100 coupled to the window assembly 30, according to an embodiment of the present disclosure. The window assembly 30 includes the window pane 32 secured to the window frame 34. A perimeter seal 50 is disposed around a perimeter 52 of the window pane 32. The perimeter seal 50 is disposed between the perimeter 52 of the window pane 32 and the window frame 34.

The window clamp system 100 is mounted to an interior rim 54 of the window frame 34. The window clamp system 100 includes a mounting bracket 102 secured to the window frame 34, such as through one or more fasteners, adhesives, and/or the like. A spring clip 104 is coupled to the mounting bracket 102 and exerts a biasing force into the perimeter seal 50, thereby securely coupling the window pane 32 to the window frame 34. A cover 106 may be positioned over a portion of the spring clip 104.

Figure 4:
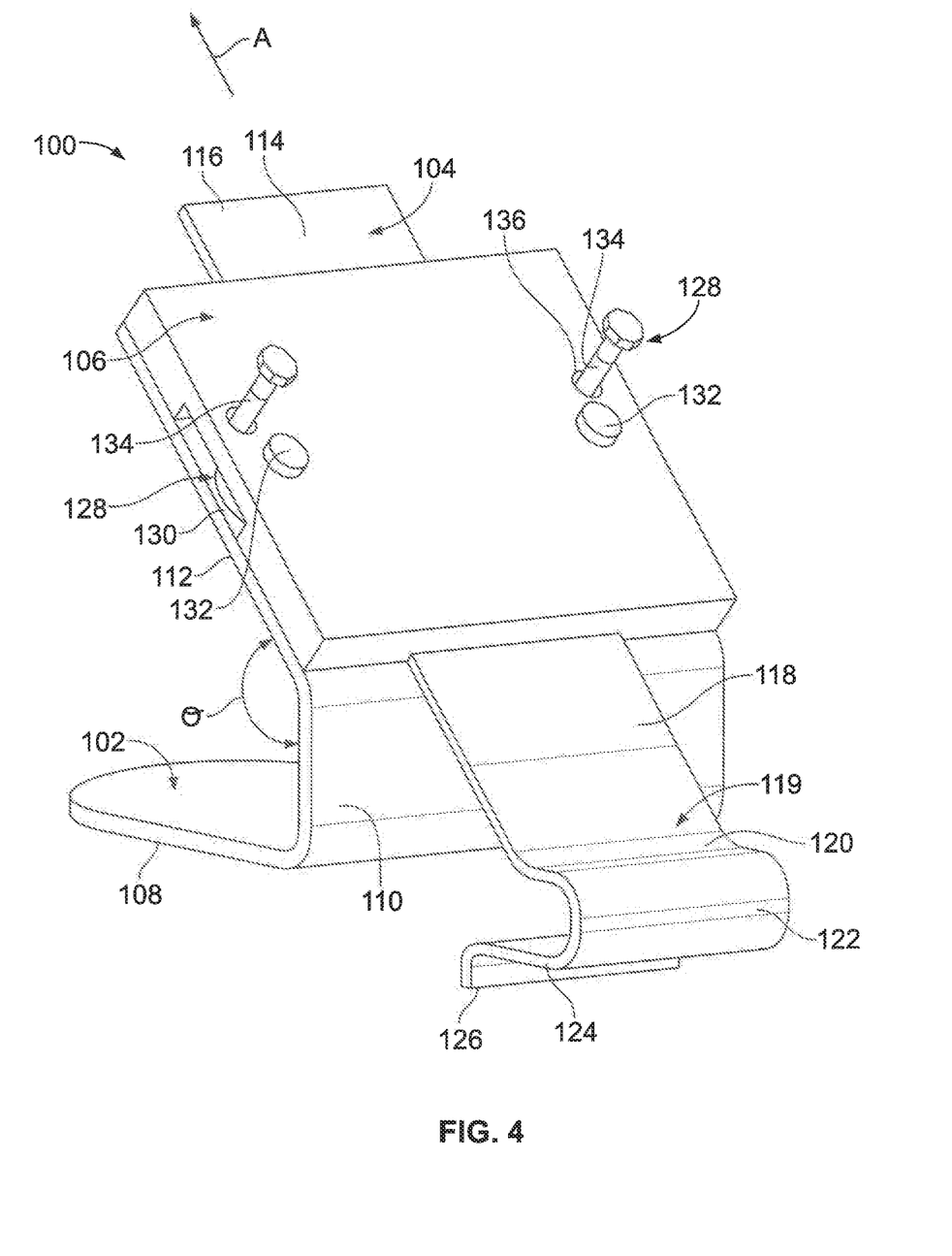
FIG. 4 illustrates a perspective front view of the window clamp system, according to an embodiment of the present disclosure.

FIG. 4 illustrates a perspective front view of the window clamp system 100, according to an embodiment of the present disclosure. The mounting bracket 102 includes a base 108, which is configured to seat on the window frame 34, such as the interior rim 54 of the window frame 34 (shown in FIG. 3). The base 108 may be a flat panel that connects to an upstanding wall 110. The upstanding wall 110, in turn, connects to a clip support wall 112, which may be angled in relation to the upstanding wall 110. For example, the upstanding wall 110 may connect to the base 108 at a right angle. The clip support wall 112 connects to the upstanding wall 110 at an angle θ, which may be 115-150 degrees, for example. As such, the clip support wall 112 upwardly and rearwardly cants in relation to the upstanding wall 110.

The spring clip 104 includes a main beam 114 that is slidably supported on the clip support wall 112. The main beam 114 has a first end 116 that may extend above the clip support wall 112, and an opposite second end 118 extending below the clip support wall 112. The second end 118 connects to a biasing spring segment 119. The main beam 114 is slidably supported on the mounting bracket 102 (such as on the clip support wall 112), and the biasing spring segment extends from the main beam 114. The biasing spring segment 119 is configured to directly engage the seal 50 (shown in FIG. 3).

The biasing spring segment 119 has a first transition beam 120 that forwardly extends from the main beam 114. The first transition beam 120 may be parallel to the base 108. The first transition beam 120 connects to a second transition beam 122 that downwardly bends, curves, bows, or the like from the first transition beam 120. The second transition beam 122 connects to a third transition beam 124 that rearwardly extends from the second transition beam 122. The third transition beam 124 may be parallel to the first transition beam 120 and the base 108. A downwardly-canted lip 126 extends from the third transition beam 124. When the spring clip 104 is in a release position, the spring clip 104 is configured to be slid relative to the clip support wall 112 of the mounting bracket 102 in the directions of arrows A.

A ratchet 128 is moveably coupled to the mounting bracket 102 on either side of the main beam 114. For example, a first ratchet is proximate a first side of the spring clip 104, and a second ratchet is proximate a second side (opposite the first side) of the spring clip 104. The ratchets 128 include clip engagers 130 that are pivotally coupled to the mounting bracket 102 through pins 132. Levers 134 extend from the clip engagers 130.

The cover 106 is secured to the mounting bracket 102 over the main beam 114 and portions of the ratchets 128. The pins 132 extend through openings (hidden from view) of the cover 106. Lever channels 136 are formed through the cover 106. The levers 134 extend through the lever channels 136. The lever channels 136 are configured to allow the levers 134 a defined range of motion. Alternatively, the window clamp system 100 may not include the cover 106.

Figure 5:
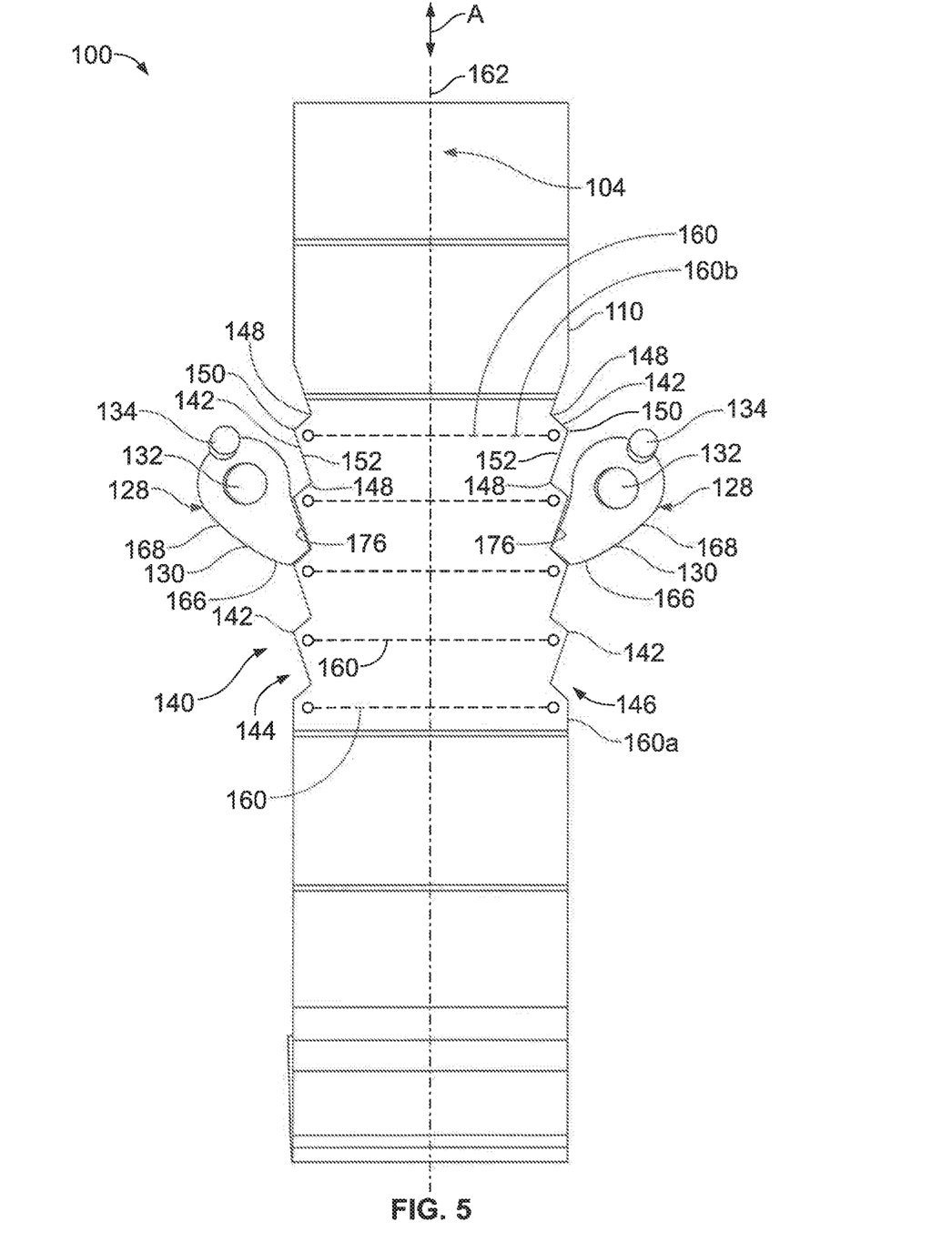
FIG. 5 illustrates a front view of ratchets engaging a spring clip of the window clamp system, according to an embodiment of the present disclosure.

FIG. 5 illustrates a front view of the ratchets 128 engaging the spring clip 104 of the window clamp system 100, according to an embodiment of the present disclosure. For the sake of clarity, the mounting bracket 102 and the cover 106 are not shown in FIG. 5.

The main beam 114 of the spring clip 104 includes a pressure adjustment segment 140. The pressure adjustment segment 140 includes a plurality of teeth 142 formed on either side 144 and 146 of the main beam 114. Each tooth 142 includes an upper indent 148 that connects to an outward apex 150, which, in turn, connects to a lower ramp 152 that leads to an upper indent 148 of tooth 142 that is immediately below. The ratchets 128 are configured to engage the plurality of teeth 142 to secure the spring clip 104 in a plurality of positions relative to the mounting bracket 102 (shown in FIG. 4).

In at least one embodiment, the pressure adjustment segment 140 also includes a plurality of pressure indicators 160 indicating an associated plurality of defined pressures that the spring clip 104 is configured to exert into the seal 50 (shown in FIG. 3). The pressure indicators 160 are defined by straight lines, which are orthogonal to a longitudinal axis 162 of the main beam 114, between apexes 150 on opposite sides 144 and 146. As shown, the main beam 114 may include five pressure indicators 160, each of which is indicative of a defined amount of pressure that the spring clip 104 is configured to exert into the window pane 32, such as through the perimeter seal 50 (shown in FIG. 3).

Each clip engager 130 of a ratchet 128 includes a spur 166 extending from a main body 168 that is pivotally coupled to the mounting bracket 102 (shown in FIG. 4) through a pin 132. Referring to FIGS. 4 and 5, as the spring clip 104 is slid over the clip support wall 112 in the directions of arrows A, the ratchets 128 outwardly pivot about the pins 132 as the apexes 150 slid over interior surfaces 176 of the spurs 166. As the spring clip 104 is further moved in the directions of arrows A, the ratchets 128 inwardly pivot about the pins 132, such that the spurs 166 nest into the indents 148, thereby emitting an audible click.

Each click may be associated with a defined pressure indicator 160. Accordingly, with each click, an individual may be informed of a particular amount of pressure that is being exerted into the window pane 32 by the window clamp system 100. The particular amounts of pressure are associated with an associated amount of pressure that is to be exerted into the window pane to ensure proper securing force. For example, one type of window assembly may require pressure associated with the lowest 160a of the pressure indicators 160 (correlated with one audible click), while another type of window assembly may require pressure associated with the highest 160b of the pressure indicators 160.

The pressure adjustment segment 140 of the spring clip 104 allows a single spring clip to be used with window assemblies of various sizes and thicknesses. That is, the window clamp system 100 includes one spring clip 104 that may be used with respect to different types of window assemblies, instead of requiring different spring clips for different window assemblies.

The pressure indicators 160 also provide a visual indication to an individual of the amount of pressure exerted by the spring clip 104 into a window pane. In at least one embodiment, with each audible click emitted by movement of the ratchets 128, a pressure indicator 160 may extend below the cover 106 (shown in FIG. 4) to provide a quick and easily-verifiable indication of the amount of pressure exerted into the window pane. In this manner, an individual need not rely on hearing audible clicks to determine an amount of exerted pressure.

The teeth 142 of the pressure adjustment segment 140 are calibrated to provide pressure $P_i$, in which i=1-5. Each of the five i positions is configured to exert a predefined amount of force into the window pane. In at least one embodiment, $P_i$ is calculated based on stress analysis. Pressure increases the further the spring clip 104 is urged towards the window pane, such that $P5>P_4>P_3>P_2>P_1$. In at least one embodiment, an individual installing a window assembly refers to a pressure scale associated with a position of the window clamp system 100 around the periphery of the window frame 34 (shown in FIG. 1) to determine the amount of pressure that the spring clip 104 is to urge into the periphery of the window pane 32. As such, the window clamp system 100 provides for consistent and controlled installation.

In at least one embodiment, the pressure adjustment segment 140 may include more or less teeth 142 on either side 144 and 146 to provide more or less pressure positions. For example, the pressure adjustment segment 140 may include six or more teeth 142 on either side 144 and 146. As another example, the pressure adjustment segment 140 may include three teeth 142 on either side 144 and 146. Alternatively, the spring clip 104 may not include the visual pressure indicators 160.

Figure 6:
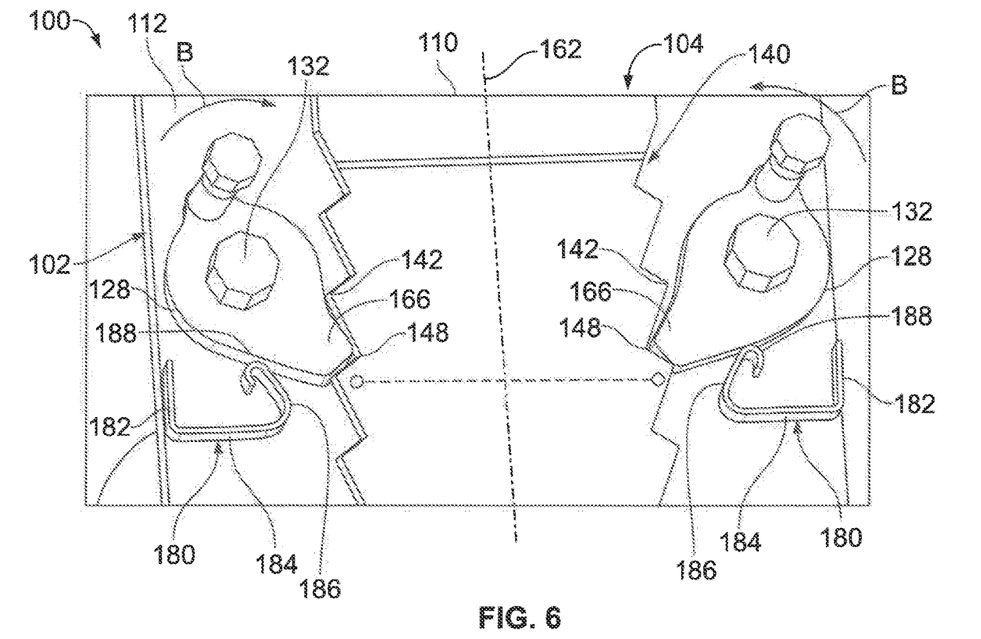
FIG. 6 illustrates a front view of the ratchets in a securing position in relation to a pressure adjustment segment of a main beam of a spring clip, according to an embodiment of the present disclosure.

FIG. 6 illustrates a front view of the ratchets 128 in a securing position in relation to the pressure adjustment segment 140 of the main beam 114 of the spring clip 104, according to an embodiment of the present disclosure. In the securing position, the spurs 166 of the ratchets 128 are nested into aligned indents 148 associated with a particular pressure.

Biasing members 180 may also be secured to the mounting bracket 102. The biasing members 180 bias the ratchets 128 towards and into the spring clip 104. For example, each biasing member 180 includes a tail 182 securely fixed to the mounting bracket 102, such as through one or more fasteners, adhesives, conforming structures (for example, secured within a channel), and/or the like. The tail 182 connects to an extension beam 184, which, in turn, connects to an inwardly-canted spring beam 186, that exerts a spring force into an outer surface 188 of a spur 166. The spring force exerted by the spring beam 186 is directed towards the longitudinal axis 162, thereby biasing the ratchets 128 towards one another and ensuring that the spurs 166 remain in the nested positions within the indents 148.

Figure 7:
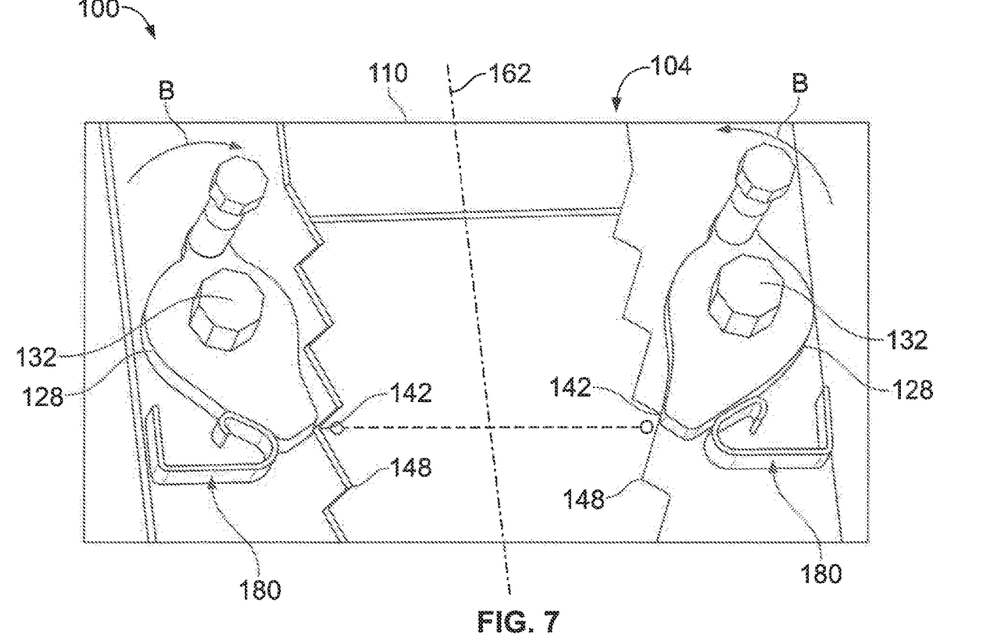
FIG. 7 illustrates a front view of the ratchets in an adjusting position in relation to the pressure adjustment segment of the main beam of the spring clip, according to an embodiment of the present disclosure.

FIG. 7 illustrates a front view of the ratchets in an adjusting position in relation to the pressure adjustment segment 140 of the main beam 114 of the spring clip 104, according to an embodiment of the present disclosure. When the spring clip 104 is urged in the directions of arrows A with sufficient force, the ratchets 128 pivot in the directions of arcs B. The force exerted by the biasing members 180 is overcome such that the spurs 166 are moved out of the indents 148 as the teeth 142 slidably engage the spurs 166. The biasing members 180 continue to exert the spring force into the spurs 166, thereby forcing the spurs 166 into other indents 148, thereby emitting an audible click. Alternatively, the window clamp system 100 may not include the biasing members 180.

Referring to FIGS. 6 and 7, in the spring clip 104 may be adjusted to different positions when the window clamp system 100, in particular one or both of the ratchets 128, is in the release position. In order to secure the spring clip 104 in a secure, fixed position, the window clamp system 100, in particular one or both of the ratchets 128, is locked in position.

Figure 8:
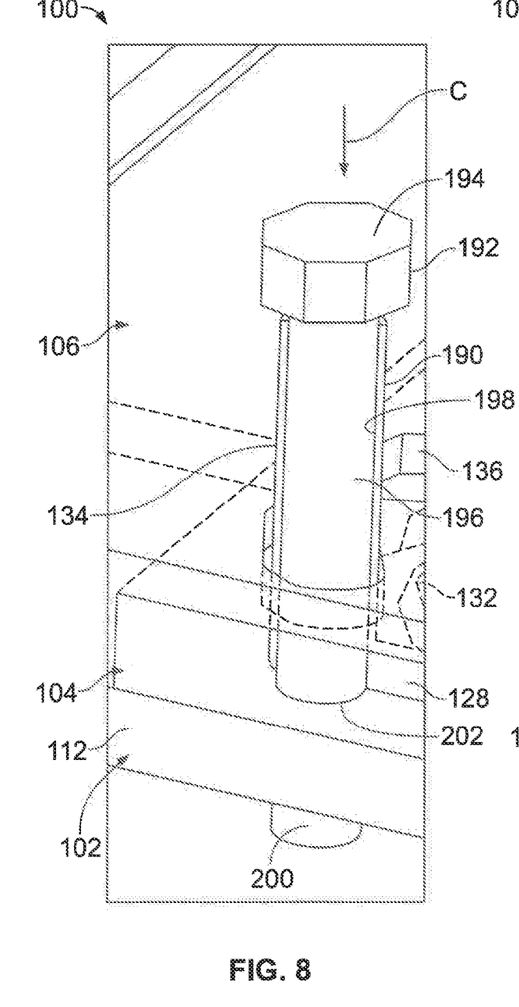
FIG. 8 illustrates a perspective view of a ratchet in a locked position, according to an embodiment of the present disclosure.

FIG. 8 illustrates a perspective view of the ratchet 128 in a locked position, according to an embodiment of the present disclosure. When the ratchet(s) 128 is in the locked position, the window clamp system 100 is in the locked position or state. As shown, the lever 134 of the ratchet 128 includes a sleeve 190 that retains a locking mechanism, such as a locking pin 192. The locking pin 192 includes a head 194 larger than the sleeve 190. As such, the head 194 does not descend into the sleeve 190. The head 194 connects to a shaft 196 that extends into a central channel 198 of the sleeve 190.

In the locked position, the locking pin 192 is pushed into the sleeve 190 towards the clip support wall 112 of the mounting bracket 102 in the direction of arrow C such that a distal end 200 of the locking pin 192 passes into and/or through a reciprocal through-hole 202 formed through the clip support wall 112. As such, the ratchet 128 is restrained from pivotal motion, and the ratchet 128 securely locks the spring clip 104 in position.

Figure 9:
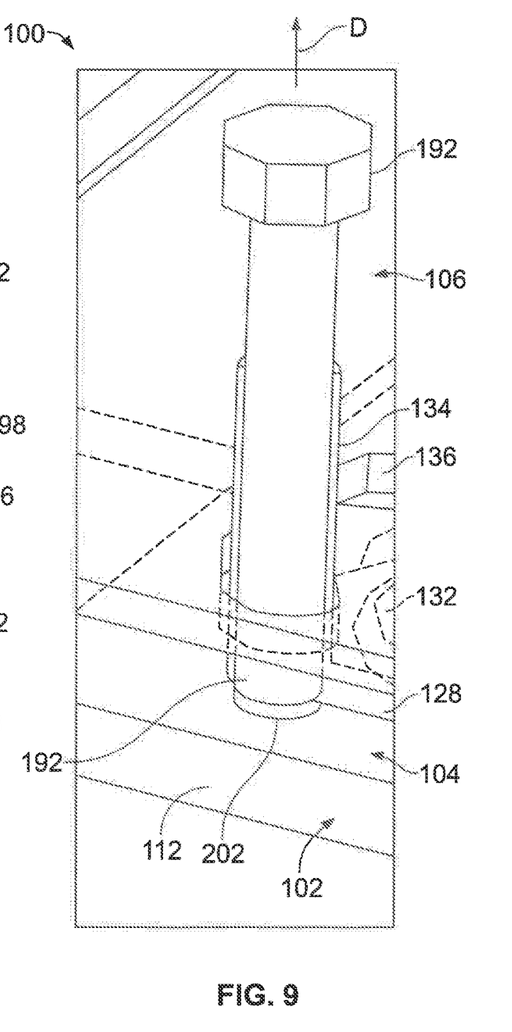
FIG. 9 illustrates a perspective view of the ratchet in a release position, according to an embodiment of the present disclosure.

FIG. 9 illustrates a perspective view of the ratchet 128 in a release position, according to an embodiment of the present disclosure. When the ratchet(s) 128 is in the release position, the window clamp system 100 is in the release position or state. In order to release the ratchet 128 from the locking position, the locking pin 192 is upwardly pulled in the direction of arrow D so that the distal end 200 is no longer in the through-hole 202, thereby allowing the ratchet 128 to pivot about the pin 132 as the spring clip 104 is slid in the directions of arrows A (shown in FIGS. 4 and 5).

Referring to FIGS. 8 and 9, the locking pins 192 are moveably coupled to the ratchets 128. The locking pins 192 extend into the through-holes 202 of the mounting bracket 102 to lock the ratchets 128 in a locked position in which the spring clip 104 is locked in position in relation to the mounting bracket 102 and the ratchets 128. The locking pins 192 are removed from the through-holes 202 so that the ratchets 128 are in a release position in which the spring clip 104 is moveable relative to the mounting bracket 102 and the ratchets 128.

Figure 10:
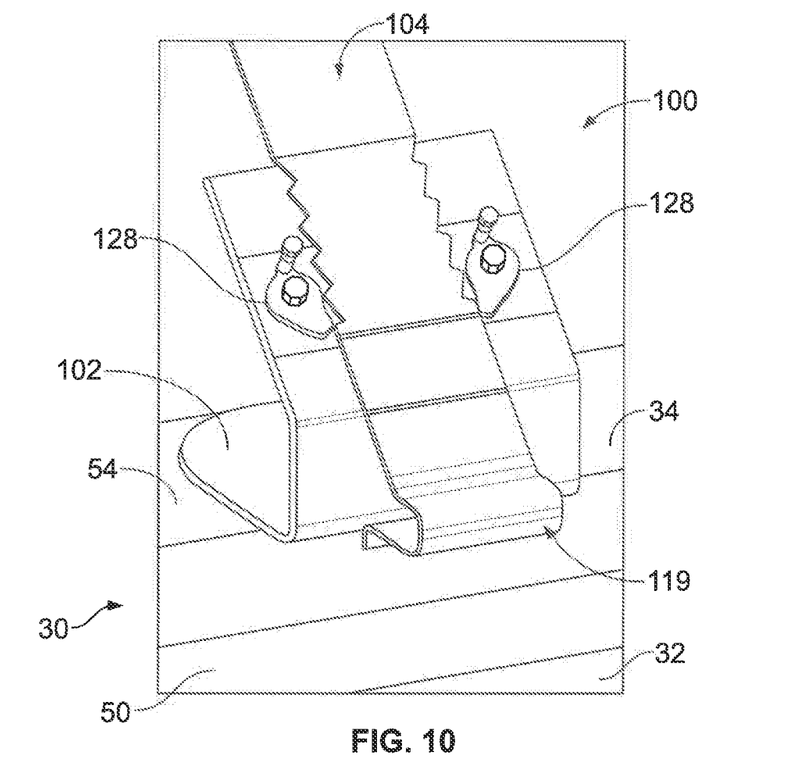
FIG. 10 illustrates a perspective interior view of a window clamp system in a release position coupled to a window assembly, according to an embodiment of the present disclosure.
Figure 11:
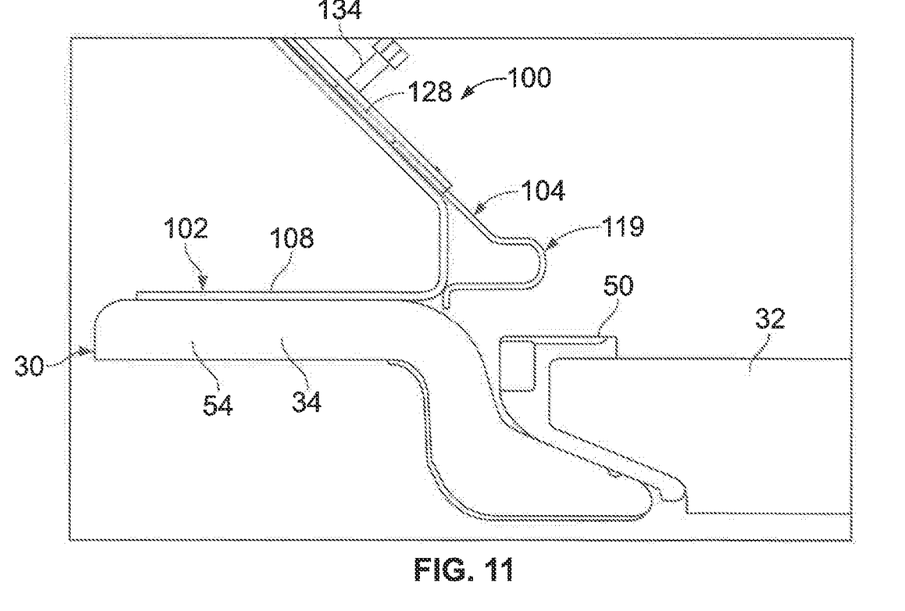
FIG. 11 illustrates a lateral view of the window clamp system in the release position coupled to the window assembly.

FIG. 10 illustrates a perspective interior view of the window clamp system 100 in a release position coupled to the window assembly 30, according to an embodiment of the present disclosure. FIG. 11 illustrates a lateral view of the window clamp system 100 in the release position coupled to the window assembly 30. Referring to FIGS. 10 and 11, in order to securely clamp the window pane 32 to the window frame 34, the window clamp system 100 is mounted to the interior rim 54 of the window frame 34 with the ratchets 128 in the release positions. A plurality of window clamp systems 100 may be mounted to the window frame 34 at defined positions, such as shown in FIG. 2. As shown, the biasing spring segment 119 of the spring clip 104 is positioned above the seal 50.

Figure 12:
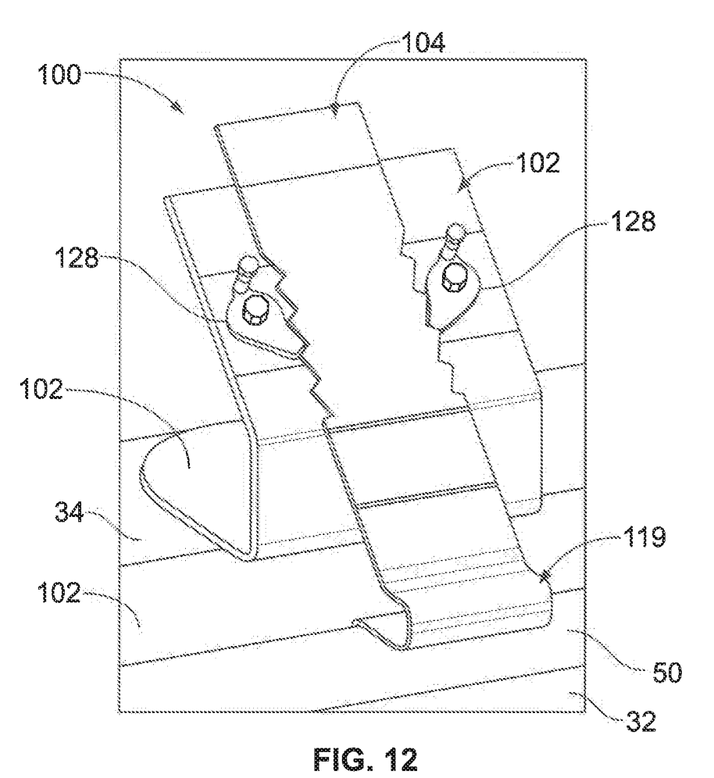
FIG. 12 illustrates a perspective interior view of a window clamp system in a locked position coupled to a window assembly, according to an embodiment of the present disclosure.
Figure 13:
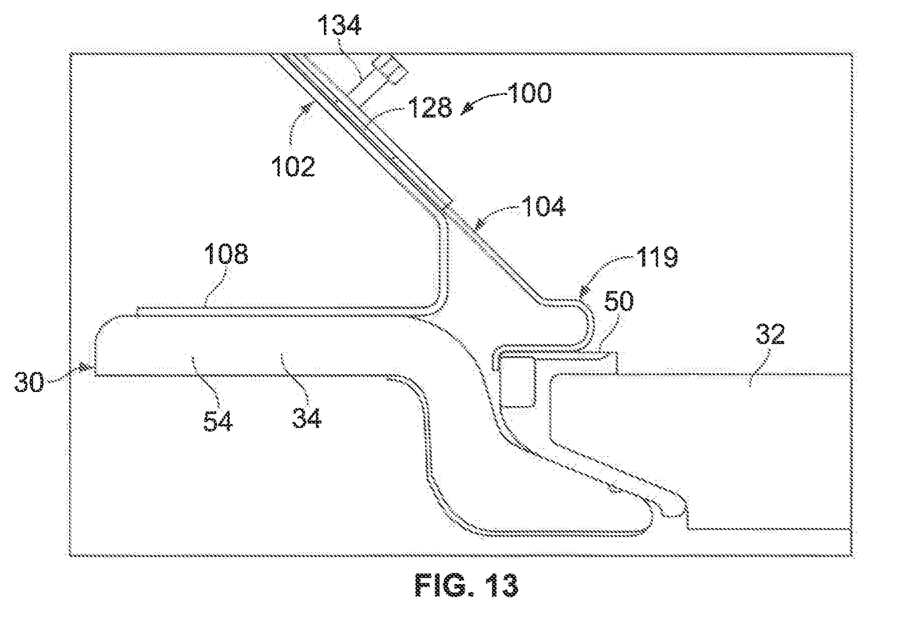
FIG. 13 illustrates a lateral view of the window clamp system in the locked position coupled to the window assembly.

FIG. 12 illustrates a perspective interior view of the window clamp system 100 in the locked position coupled to the window assembly 30, according to an embodiment of the present disclosure. FIG. 13 illustrates a lateral view of the window clamp system 100 in the locked position coupled to the window assembly 30. Referring to FIGS. 10-13, when the ratchets 128 are in the release position, the spring clip 104 is slid towards the seal 50. As the biasing spring segment 119 engages the seal 50, the ratchets 128 generate audible clicks indicating the amount of calibrated pressure exerted into the seal 50. The pressure indicators 160 (shown in FIG. 5) may extend below the cover 106, thereby providing visual verification of the amount of pressure exerted into the seal 50. An individual adjusts the spring clip 104 in relation to the mounting bracket 102 to provide a desired amount of clamping force into the seal 50, thereby securely clamping the window pane 32 to the window frame 34. After the desired amount of clamping force is attained, the locking pins 192 are urged into the through-holes 202 of the mounting bracket 102, as described above with respect to FIGS. 8 and 9, thereby securing the ratchets 128 in the locked position, and securely clamping the window pane 32 to the window frame 34.

In at least one embodiment, in order to release the window clamp system 100 from the locked position or state, the locking pins 192 are pulled out from the through-holes 202. The levers 134 may then be engaged, such as by being pivoted towards one another, thereby releasing the ratchets 128 from the spring clip 104. The spring clip 104 may then be upwardly pulled away from engagement with the seal 50.

Figure 14:
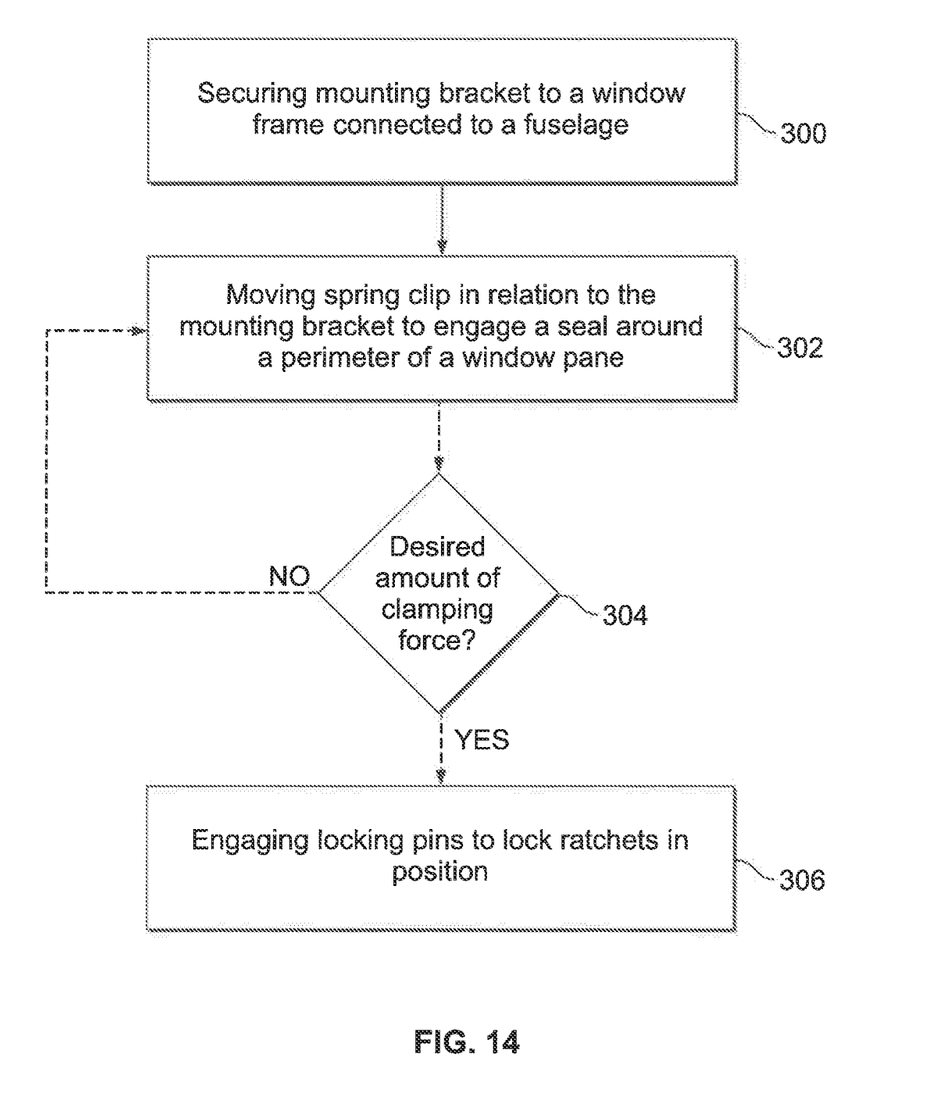
FIG. 14 illustrates a flow chart of a method of securely clamping a window pane to a window frame secured to a fuselage of a vehicle, according to an embodiment of the present disclosure.

FIG. 14 illustrates a flow chart of a method of securely clamping a window pane to a window frame secured to a fuselage of a vehicle, according to an embodiment of the present disclosure. Referring to FIGS. 1-14, the method includes, at 300, securing the mounting bracket 102 of the window clamp system 100 to the window frame 34, which is connected to the fuselage 18. For example, the base 108 of the mounting bracket 102 may be secured to the window frame 34 through reciprocal connections, one or more fasteners, adhesives, and/or the like.

The method includes, at 302, moving the spring clip 104 in relation to the mounting bracket 102 to engage the seal 50 around a perimeter of the window pane 32. For example, the biasing spring segment 119 of the spring clip 104 is urged into the seal 50.

In at least one embodiment, the method may further include at 304, determining whether a desired amount of clamping force 304 is exerted by the spring clip 104 into the seal 50. The amount of clamping force 304 may be audibly noted, such as through movement of the ratchets 128 described above, and/or visually noted, such as through pressure indicators 160 appearing below the cover 106. If the desired amount of clamping force has not been attained, the method returns to 302. If, however, the desired amount of clamping force has been attained, the method proceeds from 304 to 306.

The method may further include, at 306, engaging the locking pins 192 to lock the ratchets 128 in position, and therefore securely lock the spring clip 104 in relation to the mounting bracket 102.

Certain embodiments of the present disclosure provide a window clamp method configured to secure the window pane 32 to the window frame 34, such as of the aircraft 10. The window clamp method includes securing the mounting bracket 102 to the window frame 34 positioned within the fuselage 18, moving the spring clip 104 in relation to the mounting bracket 102 and one or more ratchets 128 coupled to the mounting bracket 102, and engaging the seal 50 positioned around the window pane 32 with the spring clip 104 through said moving.

In at least one embodiment, said moving includes slidably moving the spring clip 104 over the clip support wall 112 of the mounting bracket 102. Said engaging may include slidably supporting the main beam 114 of the spring clip 104 on the mounting bracket 102, and engaging the seal 50 with the biasing spring segment 119 extending from the main beam 114.

In at least one embodiment, said moving includes pivotally coupling the clip engager(s) 130 of the ratchet(s) 128 to the mounting bracket 102 through a pin(s) 132, and moving the lever(s) 134 that extends from the clip engager(s) 130.

In at least one embodiment, the window clamp method also includes securing a cover 106 to the mounting bracket 102 over at least a portion of the spring clip 104 and a portion of the ratchet(s) 128.

In at least one embodiment, said moving includes engaging, by the ratchet(s) 128, the plurality of teeth 142 of the pressure adjustment segment 140 of the spring clip 104, and securing the spring clip 104 in a plurality of positions relative to the mounting bracket 102 by the ratchet(s) 128 engaging the plurality of teeth 142.

In at least one embodiment, the window clamp method also includes providing, on the pressure adjustment segment 140, a plurality of pressure indicators 160 indicating a plurality of defined pressures that the spring clip 104 is configured to exert into the seal 50. The window clamp method may also include biasing, by one or more biasing members 180, the ratchet(s) 128 towards the spring clip 104.

In at least one embodiment, the window clamp method includes extending one or more locking pins 192 that are moveably coupled to the ratchet(s) 128 into one or more through-holes 202 of the mounting bracket 102 to lock the ratchet(s) 128 in a locked position in which the spring clip 104 is locked in position in relation to the mounting bracket 102 and the ratchet(s) 128. In at least one embodiment, the method also includes removing the locking pin(s) 192 from the through-hole(s) 202 so that the ratchet(s) 128 are in a release position in which the spring clip 104 is moveable relative to the mounting bracket 102 and the ratchet(s) 128.

As described herein, embodiments of the present disclosure provide systems and methods for efficiently and easily installing window assemblies on a vehicle, such as a commercial aircraft. Further, embodiments of the present disclosure provide systems and methods for quickly and easily verifying that the window assemblies are properly installed.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A window clamp system configured to secure a window pane to a window frame of a vehicle, the window clamp system comprising:
   a mounting bracket configured to be secured to the window frame;
   one or more ratchets coupled to the mounting bracket, wherein the one or more ratchets comprise a clip engager pivotally coupled to the mounting bracket through a pin, and a lever extending from the clip engager; and
   a spring clip configured to move in relation to the mounting bracket and the one or more ratchets, wherein the spring clip is configured to engage a seal positioned around the window pane.

2. The window clamp system of claim 1, wherein the mounting bracket comprises:
   a base configured to seat on the window frame;
   an upstanding wall connected to the base; and
   a clip support wall connected to the upstanding wall, wherein the spring clip is slidably coupled to the clip support wall.

3. The window clamp system of claim 1, wherein the spring clip comprises:
   a main beam slidably supported on the mounting bracket; and
   a biasing spring segment extending from the main beam, wherein the biasing spring segment is configured to directly engage the seal.

4. The window clamp system of claim 1, wherein the one or more ratchets comprises a first ratchet proximate a first side of the spring clip, and a second ratchet proximate a second side of the spring clip.

5. The window clamp system of claim 1, further comprising a cover secured to the mounting bracket over at least a portion the spring clip and a portion of the one or more ratchets.

6. The window clamp system of claim 1, wherein the spring clip comprises a pressure adjustment segment including a plurality of teeth, wherein the one or more ratchets are configured to engage the plurality of teeth to secure the spring clip in a plurality of positions relative to the mounting bracket.

7. The window clamp system of claim 6, wherein the pressure adjustment segment comprises a plurality of pressure indicators indicating a plurality of defined pressures that the spring clip is configured to exert into the seal.

8. The window clamp system of claim 1, further comprising one or more biasing members that bias the one or more ratchets towards the spring clip.

9. The window clamp system of claim 1, further comprising one or more locking pins moveably coupled to the one or more ratchets, wherein the one or more locking pins extend into one or more through-holes of the mounting bracket to lock the one or more ratchets in a locked position in which the spring clip is locked in position in relation to the mounting bracket and the one or more ratchets, and wherein the one or more locking pins are removed from the one or more through-holes so that the one or more ratchets are in a release position in which the spring clip is moveable relative to the mounting bracket and the one or more ratchets.

10. A window clamp method configured to secure a window pane to a window frame of a vehicle, the window clamp method comprising:
    securing a mounting bracket to the window frame positioned within a fuselage of the vehicle;
    moving a spring clip in relation to the mounting bracket and one or more ratchets coupled to the mounting bracket, wherein said moving comprises pivotally coupling a clip engager of the one or more ratchets to the mounting bracket through a pin, and moving a lever that extends from the clip engager; and
    engaging a seal positioned around the window pane with the spring clip through said moving.

11. The window clamp method of claim 10, wherein said moving comprises slidably moving the spring clip over a clip support wall of the mounting bracket.

12. The window clamp method of claim 10, wherein said engaging comprises:
    slidably supporting a main beam of the spring clip on the mounting bracket; and
    engaging the seal with a biasing spring segment extending from the main beam.

13. The window clamp method of claim 10, further comprising securing a cover to the mounting bracket over at least a portion the spring clip and a portion of the one or more ratchets.

14. The window clamp method of claim 10, wherein said moving comprises:
    engaging, by the one or more ratchets, a plurality of teeth of a pressure adjustment segment of the spring clip; and
    securing the spring clip in a plurality of positions relative to the mounting bracket by the one or more ratchets engaging the plurality of teeth.

15. The window clamp method of claim 14, further comprising providing, on the pressure adjustment segment, a plurality of pressure indicators indicating a plurality of defined pressures that the spring clip is configured to exert into the seal.

16. The window clamp method of claim 10, further comprising biasing, by one or more biasing members, the one or more ratchets towards the spring clip.

17. The window clamp method of claim 10, further comprising:
    extending one or more locking pins moveably coupled to the one or more ratchets into one or more through-holes of the mounting bracket to lock the one or more ratchets in a locked position in which the spring clip is locked in position in relation to the mounting bracket and the one or more ratchets; and
    removing the one or more locking pins from the one or more through-holes so that the one or more ratchets are in a release position in which the spring clip is moveable relative to the mounting bracket and the one or more ratchets.

18. An aircraft comprising:
a fuselage; and
a window assembly secured to the fuselage, wherein the window assembly comprises a window frame, a window pane, a seal positioned around the window pane, and a plurality of window clamp systems that secure the window pane to the window frame, wherein each of the window clamp systems comprises:
- a mounting bracket secured to the window frame, wherein the mounting bracket comprises one or more through-holes;
- one or more ratchets coupled to the mounting bracket;
- a spring clip configured to move in relation to the mounting bracket and the one or more ratchets, wherein the spring clip engages the seal positioned around the window pane;
- one or more biasing members that bias the one or more ratchets towards the spring clip; and
- one or more locking pins moveably coupled to the one or more ratchets, wherein the one or more locking pins extend into the one or more through-holes of the mounting bracket to lock the one or more ratchets in a locked position in which the spring clip is locked in position in relation to the mounting bracket and the one or more ratchets, and wherein the one or more locking pins are removed from the one or more through-holes so that the one or more ratchets are in a release position in which the spring clip is moveable relative to the mounting bracket and the one or more ratchets.

19. A window clamp system configured to secure a window pane to a window frame of a vehicle, the window clamp system comprising:
- a mounting bracket configured to be secured to the window frame;
- a first ratchet coupled to the mounting bracket;
- a second ratchet coupled to the mounting bracket; and
- a spring clip configured to move in relation to the mounting bracket and the one or more ratchets, wherein the first ratchet is proximate a first side of the spring clip, and the second ratchet is proximate a second side of the spring clip, and wherein the spring clip is configured to engage a seal positioned around the window pane.

20. A window clamp system configured to secure a window pane to a window frame of a vehicle, the window clamp system comprising:
- a mounting bracket configured to be secured to the window frame;
- one or more ratchets coupled to the mounting bracket, wherein the one or more ratchets comprise a clip engager, and a lever extending from the clip engager;
- a spring clip configured to move in relation to the mounting bracket and the one or more ratchets, wherein the spring clip is configured to engage a seal positioned around the window pane; and
- a cover secured to the mounting bracket over at least a portion the spring clip and a portion of the one or more ratchets.

21. A window clamp system configured to secure a window pane to a window frame of a vehicle, the window clamp system comprising:
- a mounting bracket configured to be secured to the window frame;
- one or more ratchets coupled to the mounting bracket;
- a spring clip configured to move in relation to the mounting bracket and the one or more ratchets, wherein the spring clip is configured to engage a seal positioned around the window pane; and
- one or more biasing members that bias the one or more ratchets towards the spring clip.

* * * * *